United States Patent Office 2,956,872
Patented Oct. 18, 1960

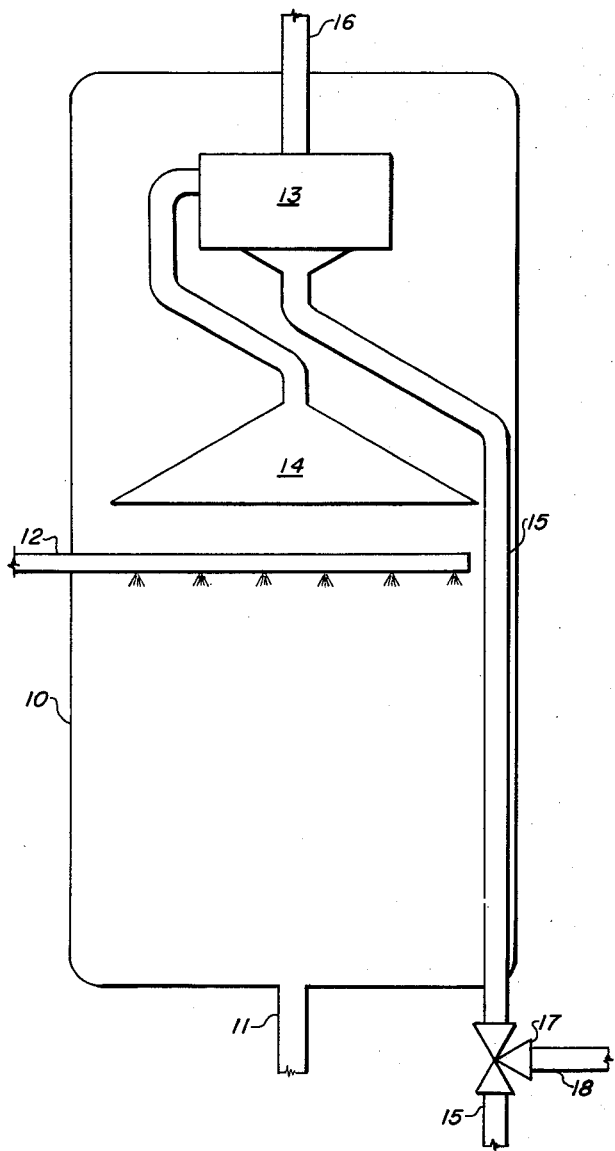

2,956,872

PREPARATION OF REFRACTORY METALS

Julian M. Avery, Greenwich, Conn., assignor to Ethyl Corporation, New York, N.Y., a corporation of Delaware Filed Jan. 23, 1956, Ser. No. 560,626

3 Claims. (Cl. 75—84.1)

The present invention is concerned with the preparation of refractory metals, in particular the preparation of such metals by reaction of their halides with alkali metal amalgams.

It has long been known that the halides of refractory metals can be reduced by an alkali metal such as sodium to obtain the refractory metal. This process has not been accepted commercially for a number of reasons. For example, the reaction is conducted at an extremely high temperature on the order of about 2000° C. Likewise the metal employed inherently contains impurities which are difficult to control and remove, and are carried forward in the product metal. Because of the high temperature employed, there is an equipment problem which must be overcome by cooling. Such cooling is critical in order to maintain the temperature of the reaction and to prevent harm to the equipment. A still further disadvantage is that recovery of the refractory metal is difficult. Since these metals have a high affinity for oxygen, nitrogen and the like constituents of the atmosphere at high temperatures, the recovery of the metal must be closely controlled in order to prevent contamination.

It has recently been proposed to overcome some of the above disadvantages of this process and other processes for the manufacture of refractory metals by reacting the refractory metal halide with an alkali metal amalgam. This reaction is conducted at a temperature below the boiling point of the amalgam. This process, although conducted at comparatively low reaction temperatures, likewise suffers particular disadvantages. The reaction rate is slow and the mixture must be agitated for efficient reaction. Inasmuch as the reaction is exothermic it must be conducted with efficient cooling or under extreme pressure in order to keep the reaction temperature below the boiling point of the amalgam. If the concentration of the alkali metal in the amalgam is high, a combination of external cooling and pressure has to be employed to maintain the low reaction temperature and keep the amalgam liquid. If it is desired to avoid external cooling in this process, an extremely high concentration of the mercury in the reaction system must be maintained for absorption of the heat produced to maintain the temperature below the boiling point of the amalgam. Additionally, low concentrations of the alkali metals in the amalgam of the order of between about 0.05 to 2.5% results in the formation of subhalides of the refractory metal which are not reduced in the reaction and therefore result in a low yield. Likewise such concentrations require even longer reaction periods. An additional disadvantage of this process is that because of the low rate of diffusion in the liquid amalgam, only essentially surface reaction is obtainable and thus for efficient operation, suitable agitation of the reaction medium must be maintained and longer reaction times are required. Since the reaction product comprises the mercury and usually some unreacted amalgam, the alkali halide and the refractory metal, recovery of the metal from the reaction mixture involves time consuming operations of heating to a sufficient temperature to vaporize the mercury, then heating to a higher temperature under vacuum to vaporize the alkali metal halide and residual mercury or alternatively draining off molten halide from the reaction mixture and then further purifying the product.

Another disadvantage of the above processes and other prior art processes is that an efficient and effective continuous process for the preparation of refractory metals has not been found. So far as is now known, such methods of preparation for refractory metals are conducted on a batch basis. It is therefore desirable to the industry to provide a continuous process for the preparation of such metals.

An object of the present invention is to provide a more efficient and practical method for the production of refractory metals from their halides by their reaction with an alkali metal amalgam. Another object of this invention is to produce such metals in higher yield and purity. An additional object is to provide a continuous method for the preparation of the refractory metals. A particular object is to prepare titanium in high yield and purity by reaction of titanium tetrachloride with sodium amalgam of an enhanced sodium concentration.

The above and other objects of this invention are accomplished by the reaction of the halide of a refractory metal with an alkali metal amalgam at a temperature above the boiling point of the amalgam, but below about 1500° C. In a more preferred embodiment, the reaction of the refractory metal halide with the alkali metal amalgam is performed at a temperature between about 500 to 1200° C. but above the boiling point of the amalgam. Thus in this process the amalgam is in the vapor state and it is preferable that the conditions of reaction be such that the halide is in the vapor state. The pressure employed is generally atmospheric pressure. The concentration of the alkali metal in the amalgam preferred is between about 3 to 10% by weight in order to achieve faster reaction rates and reduce handling problems. A particularly preferred embodiment of this invention is feeding the alkali metal amalgam, at at least its boiling point, downward into a reaction zone while simultaneously feeding the refractory metal halide, either in the liquid or vapor state, upwardly into the reaction zone while maintaining the reaction zone under conditions whereby the reactants are in the vapor state, the rate of feed of the amalgam and halide being such that an excess of the amalgam, between about 10 to 25%, is maintained in the reaction zone, and withdrawing all the reaction products continuously from the upper portion of the reaction zone and recovering the refractory metal therefrom. In a still more particular embodiment, the reaction zone contains in the upper portion thereof a means for separating the mercury and excess alkali metal, which is withdrawn overhead, from the refractory metal and the alkali halide which is transmitted through a confined space downwardly through the reaction zone and discharged near the bottom. Generally, the refractory metal halide is titanium tetrachloride and the alkali metal amalgam is sodium amalgam, both being preferred because of greater availability and economy.

There are many advantages of the present process over the prior art processes. By reason of the mercury vapors contained in the reaction zone there is an in situ control of the reaction temperature. In most instances, depending upon the concentration of the alkali metal in the amalgam and the reaction temperature desired, external heating or cooling is not required once the reaction has been initiated. Likewise the mercury vapor serves as an inert medium in which to conduct the reaction and thus other atmospheres such as argon and the like, required by the prior art processes, need not be employed. Another advantage is that the refractory metal can be separated directly from the products discharged from the reaction zone or alternatively it can be separated along with the alkali metal halide which can then be filtered in steps. By the process of this invention the reducer is in purer form, since contaminants normally contained in the commercial alkali metal itself are not present in the amalgam. Likewise, the amalgam is a more economical form of the reducer than the metal itself. A particular advantage of this process is that faster reaction is obtained and it can be conducted continuously without the necessity of excessive external cooling or heating to maintain the reaction temperature. Additionally since the reacting mixture comprises reactants in the gaseous phase and products suspended therein, additional agitation of the reacting mixture is not required in order to achieve efficient contact of the reactants. Still further, the refractory metal is more easily recovered in high yield and purity by simple separation techniques such as direct withdrawal or filtration.

The term refractory metal halide is intended to include the halides of the metals of the group IV-A, V-A, and VI-A of the periodic system. These metals include for example, titanium, zirconium, hafnium, thorium, chromium, vanadium, uranium, and the like. The particularly preferred refractory metals are titanium, zirconium, vanadium and thorium, which are especially suitable in the process of this invention. The halides thereof include the chlorides, bromides, iodides and fluorides. The chlorides, particularly the tetrachlorides, being more readily available, easier to handle, and economical, are preferred.

In general any alkali metal amalgam can be employed in the process of this invention such as those of sodium, potassium, lithium, rubidium, and cesium. Sodium amalgam is generally employed since it is commercially available. Such amalgam is obtained as a by-product in the manufacture of chlorine by the use of a mercury cathode chlorine cell. The amalgam so-produced usually has a concentration less than 0.5% by weight of sodium. Amalgam of higher sodium concentrations can be obtained by adding additional metallic sodium to the dilute amalgam or by distilling the mercury from the dilute amalgam. One efficient method for preparing more concentrated amalgams is by compressive distillation. Briefly, the compressive distillation comprises boiling the amalgam under a pressure, preferably of at least about 100 p.s.i.a., the compressed mercury rich vapor being used for indirect heat exchange. Such operation results in an increase of the heat contained in the mercury which can be employed for providing process steam or heat through various heat exchangers. An additional advantage of this technique is that the amount of work input is reduced, therefore the compressive distillation operation can be coupled with the process of the present invention to result in additional advantages and economy, i.e., the alkali metal enriched amalgam produced during the compressive distillation can be fed directly to the reaction zone employed for reaction with the refractory halide with suitable means for maintaining the amalgam at its boiling point or at an elevated temperature.

In general, it is preferred to employ an amalgam containing between about 3 to 10% by weight of alkali metal, particularly sodium, since faster reaction rates are obtained, the activity of the amalgam is greater, and the handling problems are minimized. Particularly preferred concentrations of the sodium in the amalgam employed are those containing 3 to 4½% or between 5½% to 10% by weight of sodium since those amalgams having about 5% by weight sodium have a higher freezing point and thus are more difficult to handle.

A particular feature of the present invention is that the reaction is conducted at a temperature above the boiling point of the amalgam but below about 1500° C. In general the temperature is dependent upon the concentration of the alkali metal in the amalgam employed and the physical state of the products desired. In order to realize economy in the process with regard to heating and cooling and to achieve most efficient and rapid reaction rate, the temperature range which has been found most suitable is between about 500 to 1200° C. provided the temperature employed is above the boiling point of the amalgam. With certain amalgams, i.e., those which boil below 500° C., lower temperatures can of course be employed; however, such are not desirable since the reaction rate will be slower. Likewise higher temperatures can be employed, but these are also to be avoided. Higher temperatures present equipment difficulties, particularly with regard to the structural materials to be employed. Thus when employing an amalgam of a particular concentration, a particular reaction range is generally employed for most efficient results. For example, with a 3½% by weight sodium amalgam in excess of about 20% the temperature of the reaction can be between 410 to 430° C.; employing a 5% amalgam in excess of about 20%, the temperature is between 540 to 595° C. In any event, regardless of the concentration of the amalgam employed, the temperature of reaction is preferably maintained between 500 to 1200° C. but still being above the boiling point of the reacting amalgam. Thus in this process the amalgam is in the vapor state and it is preferable that the conditions of reaction be such that the refractory halide is in the vapor state. In a still more preferred embodiment, the reaction is conducted under conditions such that the amalgam and the refractory halide are above their boiling points and the alkali halide is above its melting point which, in general, is between about 800° to 1000° C. Operating within this temperature range results in the alkali halide produced being molten where it can be readily separated from the product metal by direct filtration.

The reaction is conducted at atmospheric pressure or elevated pressures. It is preferable to employ a slight pressure in the system for most effective operation. Therefore a preferred range of operating pressure is between about 15 to 20 p.s.i.a. Pressures below 15 p.s.i.a. are not desired since some contaminating gases may then enter the reaction zone and result in contamination of the product. Likewise, pressures substantially above 20 p.s.i.a. are not desired since vaporization of the by-products of the reaction is not as readily achieved without applying excessive temperatures.

In general the reactants are present in the reaction zone in at least their stoichiometric quantities. However, it is preferred to maintain an excess of the amalgam at all times. To eliminate formation of subhalides and provide faster reaction rates, it is preferred to employ between about 10 to 25% by weight excess amalgam based upon its alkali metal content.

One method of carrying out the process of this invention comprises providing a reaction zone having inlets near its lower and upper extremities, and an outlet near its upper extremity, generally positioned above the inlet contained in the upper portion of the reaction zone. In operation, for example, with titanium tetrachloride and sodium amalgam containing 4% by weight sodium, titanium tetrachloride preheated to a temperature of 38° C. is continuously fed upwardly into the reaction zone and the amalgam, preheated to a temperature of 410° C. which is its boiling point, is fed downwardly into the reaction zone with the rate of feed being such that a slight excess of the amalgam is maintained. The reaction zone is preheated to about 550° C. and maintains this temperature by the simultaneous reaction of the reactants and the vaporization of the mercury. From the top of the reaction zone there is continuously withdrawn finely divided titanium particles along with sodium chloride, excess sodium, and mercury vapor. The product stream is immediately transmitted to a recovery system in which the solids are removed from the vapor by settling techniques. The titanium can then be removed from the sodium chloride by an operation such as leaching or further heating the mixture to the vaporization temperature of the sodium chloride at atmospheric or below atmospheric pressure.

Still another method of conducting the process of this invention is a modification of the above reaction zone which is shown in the accompanying diagram. Referring to the diagram, a reaction zone 10 is provided having an inlet 11 near its lower extremity and an inlet 12 near its upper extremity, and incorporated within the reaction zone is a cyclone separator 13. The cyclone separator 13 has an inlet 14 for receiving reacted materials which enter the cyclone for separation, a discharge 16 for vapor escape, and a discharge 15 extending and providing an enclosed chamber for external discharge of the product near the bottom of the reaction zone. The line 15 has included therein a T-valve 17 through which an inert atmosphere can be fed from line 18 when some mercury may adhere to the particles discharged therefrom. The inert atmosphere is generally preheated to about the reaction temperature.

To describe the employment of this modification, again using titanium tetrachloride as the reactant and 4% by weight sodium amalgam, the titanium tetrachloride is fed into the inlet 11 while simultaneously feeding amalgam into the inlet 12. The reaction products continuously moving upward, along with the vaporization of the amalgam drives a mixture of titanium powder, sodium chloride particles, excess sodium if such is employed, and mercury vapor into the inlet 14 of the cyclone 13 and, as conventionally occurs in such equipment, the mercury vapor and excess sodium are discharged through outlet 16 leaving the titanium and sodium chloride particles to drop through discharge chamber 15 and out of the reaction zone. Should some mercury be included with this discharge, prepurified argon is fed under pressure and at the temperature of the reaction zone through line 18. Such operation carries the mercury vapor back into the cyclone, and the mercury and argon are removed through line 16. The titanium is then recovered from the sodium chloride by leaching or distillation.

In either of the above embodiments of this invention it is preferred that the reaction zone be maintained between about 500 to 1200° C. while still above the boiling point of the amalgam. Employing these temperatures produces a product in the first of the above embodiments consisting of a discharge stream of mercury vapor, sodium chloride and solid titanium which can be maintained at the temperature of discharge so that the sodium chloride and titanium will drop out of the stream and can be immediately separated by filtration, upon heating, is necessary, above the melting point of the sodium chloride. In the latter of the above embodiments, the discharging solid titanium and sodium chloride can be immediately filtered at a temperature above about 800° C. to recover the solid titanium. In either operation, any sodium chloride which adheres to the titanium particles can be removed by leaching or distillation under vacuum. The filtration and cooling of the product metal is conducted in an inert atmosphere such as argon, preferably prepurified, helium, neon and the like.

To further demonstrate the process of this invention, the following examples are presented wherein all parts are by weight unless otherwise specified.

*Example I*

A reactor is provided having an inlet at the bottom, an outlet at the top and an inlet near the top but below the outlet therein. Into the inlet at the bottom is continuously fed titanium tetrachloride which has been preheated to a temperature of 38° C. Simultaneously, 4% sodium amalgam preheated to 410° C. is supplied through the inlet in the top of the reactor, the reactor having been preheated to about 450° C. The feed rates are controlled to maintain an excess of 20% of the amalgam based upon its sodium content. The heat supplied to the reactor is then cut off. The temperature in the reactor stabilizes at 443° C. During the continuous operation the products of the reaction are continuously discharged from the outlet at the top of the reaction zone. The product stream is heated externally to 1000° C. where the mercury, being in the gaseous phase, is withdrawn and separated and the sodium chloride becomes molten. The sodium chloride, containing the titanium, is then subjected to filtration under an atmosphere of prepurified argon. The titanium, is then heated to 1500° C. under vacuum to remove adhering sodium chloride and then cooled. During these recovery operations and cooling of the titanium particles, the prepurified argon atmosphere is continuously maintained. The titanium is obtained in high purity and yield. Essentially no subhalides are formed.

*Example II*

This run is conducted essentially as described in Example I with the exception that during the operation the amalgam and titanium tetrachloride are maintained in essentially stoichiometric proportions. The temperature in the reactor stabilizes at 593° C. In this instance, high purity titanium is obtained in essentially quantitative yield and no subhalides are detected.

In contrast to the operation set forth in Example II, when titanium is produced by reaction of the same amalgam with the titanium tetrachloride at the boiling point of the amalgam, 410° C., it is found that 340,000 B.t.u.'s per pound mole of titanium produced must be removed from the reaction zone and the reaction time is longer. In further contrast to the result obtained above, when employing temperatures below the boiling point of the amalgam, an even greater amount of heat removal is required along with longer reaction times.

*Example III*

The procedure of Example I is repeated with the exception that in this instance a 10% sodium amalgam is employed being fed at 502° C. with the titanium tetrachloride being fed at 38° C. In this instance the proportion of the amalgam to the titanium tetrachloride is maintained in essentially stoichiometric amount. The temperature in the reactor stabilizes at 1500° C. The products continuously removed from the reactor comprise mercury vapor, sodium chloride vapor and finely divided titanium particles. The discharge stream is maintained at essentially the temperature of discharge and the finely divided titanium particles are separated from the gaseous stream by a reduction in velocity wherein they drop out and are collected and cooled under a prepurified argon atmosphere. The mercury-sodium chloride gas stream is cooled externally to about 1000° C. wherein the sodium chloride becomes molten, dropping out of the mercury vapor stream and is recovered. The mercury vapor stream is employed in other operations as a heat exchange medium for producing steam. The condensed mercury is then employed for producing the sodium amalgam. Essentially pure titanium is recovered in high yield.

*Example IV*

In this run the reactor is modified as shown in the figure and described previously. Into the inlet 11 is continuously fed titanium tetrachloride at 38° C. and simultaneously into the inlet 12 there is continuously fed a 5% sodium-mercury amalgam at 427° C. which is the boiling point of the amalgam. The rate of feed of these two reactants is such that a 20% excess of the amalgam is maintained during the operation. Without supplying external heat or cooling the reaction zone stabilizes at 554° C. With steady state operation, mercury vapor is discharged through outlet 16 and solid titanium and sodium chloride particles pass through discharge line 15 wherein they contact a prepurified stream of argon, maintained at 500° C. and a slight positive pressure, which removes adhering mercury carrying it in the cyclone 13 and thus out discharge line 16. The finely divided titanium and sodium chloride is then subjected to separation by heating the stream to 1500° C. under vacuum thereby vaporizing the sodium chloride from the titanium. The titanium is then cooled to room temperature. In the recovery operation an atmosphere of prepurified argon is continuously maintained.

*Example V*

The procedure of Example IV is repeated with the exception that zirconium tetrachloride is employed in place of the titanium tetrachloride. The zirconium tetrachloride is fed as a vapor at 300° C. and the reaction zone is externally heated to maintain the temperature during reaction at 850° C. In this instance, the products discharged through line 15 comprise zirconium and molten sodium chloride. This mixture is subjected to filtration while maintained under a prepurified argon atmosphere, and the finely divided particles recovered are further heated to about 1500° C. under vacuum to remove any adhering sodium chloride. Essentially pure zirconium is recovered in high yield.

*Example VI*

Employing the procedure of Example IV with the exception that thorium tetrachloride is employed, being fed at 850° C. and the sodium amalgam is a 6.5% amalgam fed at its boiling point, high purity thorium is recovered in high yield when maintaining the reaction zone at a temperature of 950° C.

*Example VII*

In this run the procedure of Example IV is repeated employing vanadium tetrachloride fed at a temperature of 148° C. with the 5% amalgam being maintained in excess of about 20%. The temperature in the reactor is maintained at 700° C. Upon subjecting the solid sodium chloride and vanadium to separation as described therein, high purity vanadium is recovered.

The foregoing examples demonstrate the employment of sodium amalgam in various concentrations of sodium in the process of this invention. Sodium amalgam is the preferred amalgam; however, amalgams of potassium, rubidium, cesium, and lithium can be substituted in the above examples to produce similar results. When employing the amalgams of the other alkali metals the stabilizing temperature of the reaction will depend upon the concentration of the metal in the amalgam and the particular metal employed. In general the stabilizing temperature will be above the boiling point of the amalgam and is preferably maintained between 500 to 1200° C. by external cooling or heating. Likewise, the other halides of the refractory metals can be employed as for example the tetraiodides and tetrabromides although such are not preferred because of their greater expense. In most instances it is desirable to maintain the reaction zone at a temperature between about 810 to 1000° C. to result in recovery of a mixture of refractory metal and molten halide of the alkali metal. Such operation permits direct filtration of the titanium from the molten halide and the metal thus recovered can be easily separated from adhering halide by further heating under vacuum to vaporize the alkali metal halide.

The mercury vapor resulting from the reaction is generally used in heating streams of other operations or can be employed in preheating the feed streams in the present process. Upon utilizing the heat values of the mercury, it is then reused in the formation of the mercury amalgam by addition of the alkali metal thereto or by its employment in the mercury cathode chlorine cells. Other means of employment of the mercury will be evident.

From the above it can be readily seen that an efficient and effective method for the preparation of these refractory metals is provided particularly upon a continuous process. These metals are of considerable utility in structural usage. Generally speaking all of the materials exhibit utility in fabrication and are especially useful where high corrosion resistance is desirable. Titanium is of increasing commercial interest at present in structural fabrication since it is of lesser weight than steel, but possesses greater tensile strength. Still another use of these materials is as electrodes in gas producing devices and as a target metal in X-ray applications. Other uses will be evident to those skilled in the art.

Having thus described the process of this invention, it is not intended that it be limited except as set forth in the following claims.

I claim:
1. In a process for producing refractory metals by reduction of a refractory metal halide with an alkali metal amalgam, the improvement which consists of feeding to a reaction zone an alkali metal amalgam having an alkali metal concentration from about 3 to 10 percent by weight and a halide of a refractory metal selected from the group consisting of titanium, zirconium, hafnium, thorium, chromium, vanadium, and uranium, bringing the temperature in the reaction zone above the boiling point of said amalgam but no greater than about 1500° C., the amalgam being fed in in vaporizable condition so that the reaction temperature is maintained by the simultaneous reaction of the reactants and the vaporization of the mercury component of the amalgam to thereby absorb the heat liberated by the reaction, removing the reaction products, including the vaporized mercury, from said reaction zone and recovering said refractory metal therefrom.

2. The process of claim 1 further defined in that the reaction zone is maintained at a temperature between about 500° and 1200° C.

3. A continuous process for the production of titanium by reduction of titanium tetrachloride with sodium amalgam which comprises continuously feeding to a reaction zone titanium tetrachloride and a sodium amalgam having a sodium concentration of from about 3 to 4½ percent by weight, bringing the temperature in the reaction zone to between about 500° and 1200° C., the amalgam being fed into the reaction zone in vaporizable condition to maintain the reaction zone temperature in said range by simultaneous reaction of the reactants and vaporization of the mercury component of said amalgam to thereby absorb the heat generated by the reaction, continuously removing the reaction products including said vaporized mercury from said reaction zone and recovering titanium metal therefrom.

References Cited in the file of this patent
UNITED STATES PATENTS

| | | |
|---|---|---|
| 2,703,752 | Glasser et al. | Mar. 8, 1955 |
| 2,758,921 | Schmidt | Aug. 14, 1956 |
| 2,813,787 | Schmidt | Nov. 18, 1957 |

FOREIGN PATENTS

| | | |
|---|---|---|
| 296,867 | Germany | Mar. 13, 1917 |